(12) United States Patent
Chen et al.

(10) Patent No.: US 6,234,593 B1
(45) Date of Patent: May 22, 2001

(54) BEZEL MOUNTING DEVICE

(75) Inventors: Yung-Long Chen, Chung-Ho; Yu-Tai Liu, Hsin-Chuang; Alvin Liu, Pa-Li, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/379,756

(22) Filed: Aug. 24, 1999

(30) Foreign Application Priority Data

Dec. 31, 1998 (TW) .................................................. 87222117

(51) Int. Cl.[7] .................................................... A47B 97/00
(52) U.S. Cl. ...................................... 312/223.2; 312/265.6
(58) Field of Search .............................. 312/223.1, 223.2, 312/263, 265.5, 265.6, 293.1, 293.3; 211/26; 361/724, 725, 726, 683

(56) References Cited

U.S. PATENT DOCUMENTS

| | | | |
|---|---|---|---|
| 5,349,132 | * 9/1994 | Miller et al. | 361/724 X |
| 5,547,272 | * 8/1996 | Paterson et al. | 312/265.6 X |
| 5,568,611 | * 10/1996 | Khatri et al. | 312/223.2 X |
| 5,742,360 | * 4/1998 | Kwon et al. | 312/223.2 X |
| 5,964,513 | * 10/1999 | Korinsky et al. | 312/223.2 |

* cited by examiner

Primary Examiner—James O. Hansen
(74) Attorney, Agent, or Firm—Wei Te Chung

(57) ABSTRACT

A bezel mounting device is adapted to mount a bezel to a front panel of a computer casing. The bezel mounting device includes a rectangular frame having top and bottom sections connected by opposite side sections. Each side section defines elongate slots for movably receiving corresponding posts extending from the bezel for movably attaching the bezel mounting device to the bezel whereby the bezel mounting device is movable between a locking position and a releasing position. Arcuate resilient members are formed on the bottom section and supported by a bottom flange of the bezel for biasing the bezel mounting device toward the locking position. A plurality of barbs are formed on the top and side sections and received in corresponding slots defined in the front panel whereby the barbs simultaneously engage with the slots of the front panel by being biased by the arcuate resilient members to attach the bezel mounting device to the front panel. The bottom section forms a handle for manually moving the bezel mounting device against the arcuate resilient members to disengage the barbs from the slots of the panel thereby releasing the bezel mounting device from the casing.

14 Claims, 3 Drawing Sheets

BEZEL MOUNTING DEVICE

BACKGROUND OF INVENTION

1. Field of the Invention

The present invention generally relates to a device for mounting a bezel to a computer casing, and in particular to a device that allows ready mounting/dismounting of a bezel.

2. The Prior Art

A personal computer comprises a chassis for supporting and fixing components thereof. A casing houses the chassis and the components therein. A bezel is mounted to a front panel of the casing for aesthetic purposes. The bezel is made of plastic with resilient barbs integrally formed therewith for engaging with corresponding holes defined in the front panel of the casing to secure the bezel to the casing. A disadvantage of the conventional bezel is that the resilient barbs may become damaged and lose their function after repeated engagement/disengagement. Means for facilitating engagement/disengagement of the resilient barbs with the casing are available on the market. Such means require simultaneously depressing several push buttons and thus are very inconvenient.

Metal fastening devices are also available for replacing the integrally formed plastic barbs. The metal fastening devices may become fatigued after frequent operation.

A bezel is an important appealing factor for the general consumer. Normally, each specific computer casing design is associated with a specific bezel, so the general consumer is prevented from choosing a preferred bezel design.

It is thus desired to provide a bezel mounting device for addressing the above problems.

SUMMARY OF THE INVENTION

Accordingly, an object of the present invention is to provide a bezel mounting device for facilitating mounting/dismounting of a bezel to/from a computer casing.

Another object of the present invention is to provide a bezel mounting device which allows a user to selectively and readily mount different bezels to a computer casing.

A further object of the present invention is to provide a bezel mounting device which allows a bezel to be mounted to different computer casings.

To achieve the above objects, a bezel mounting device in accordance with the present invention comprises a rectangular frame having top and bottom sections connected by opposite side sections. The rectangular frame is interposed between a bezel and a front panel of a computer casing for mounting the bezel to the front panel. Each side section of the frame defines elongate slots for movably receiving corresponding posts extending from the bezel for movably attaching the bezel mounting device to the bezel whereby the bezel mounting device is movable between a locking position and a releasing position. Arcuate resilient members are formed on the bottom section and supported by a bottom flange of the bezel for biasing the bezel mounting device toward the locking position. A plurality of barbs are formed on the top and side sections and received in corresponding slots defined in the front panel whereby the barbs simultaneously engage with the slots of the front panel by being biased by the arcuate resilient members to attach the bezel mounting device to the front panel. The bottom section forms a handle for facilitating manually moving the bezel mounting device against the arcuate resilient members to disengage the barbs from the slots of the panel thereby releasing the bezel mounting device from the casing.

BRIEF DESCRIPTION OF THE DRAWINGS

The present invention will be apparent to those skilled in the art by a reading the following description of a preferred embodiment thereof, with reference to the accompanying drawings, in which.

DETAILED DESCRIPTION OF THE PREFERRED EMBODIMENT

Figure 1:
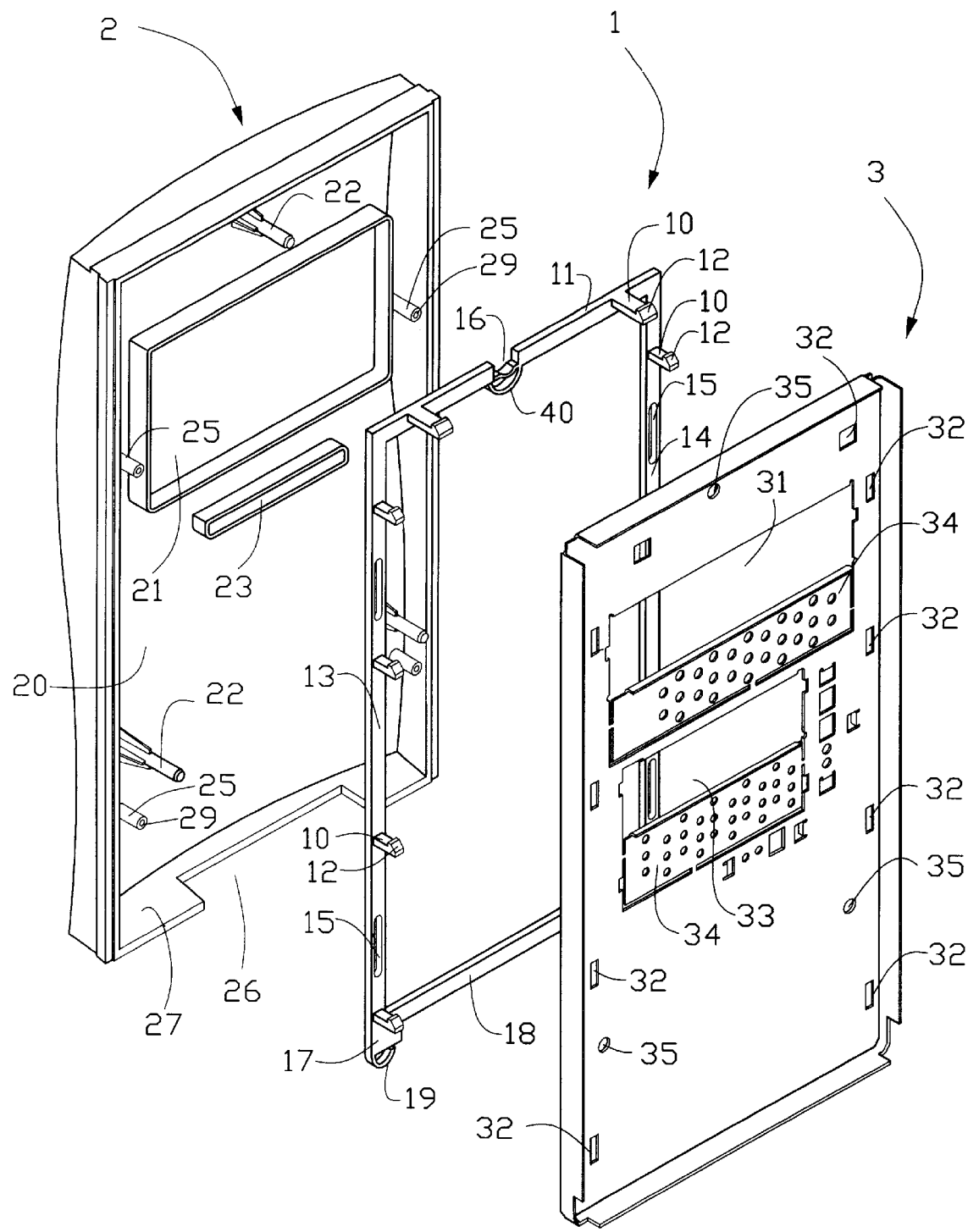
FIG. 1 is an exploded view showing a bezel mounting device constructed in accordance with the present invention for mounting a bezel to a front panel of a casing.
Figure 2:
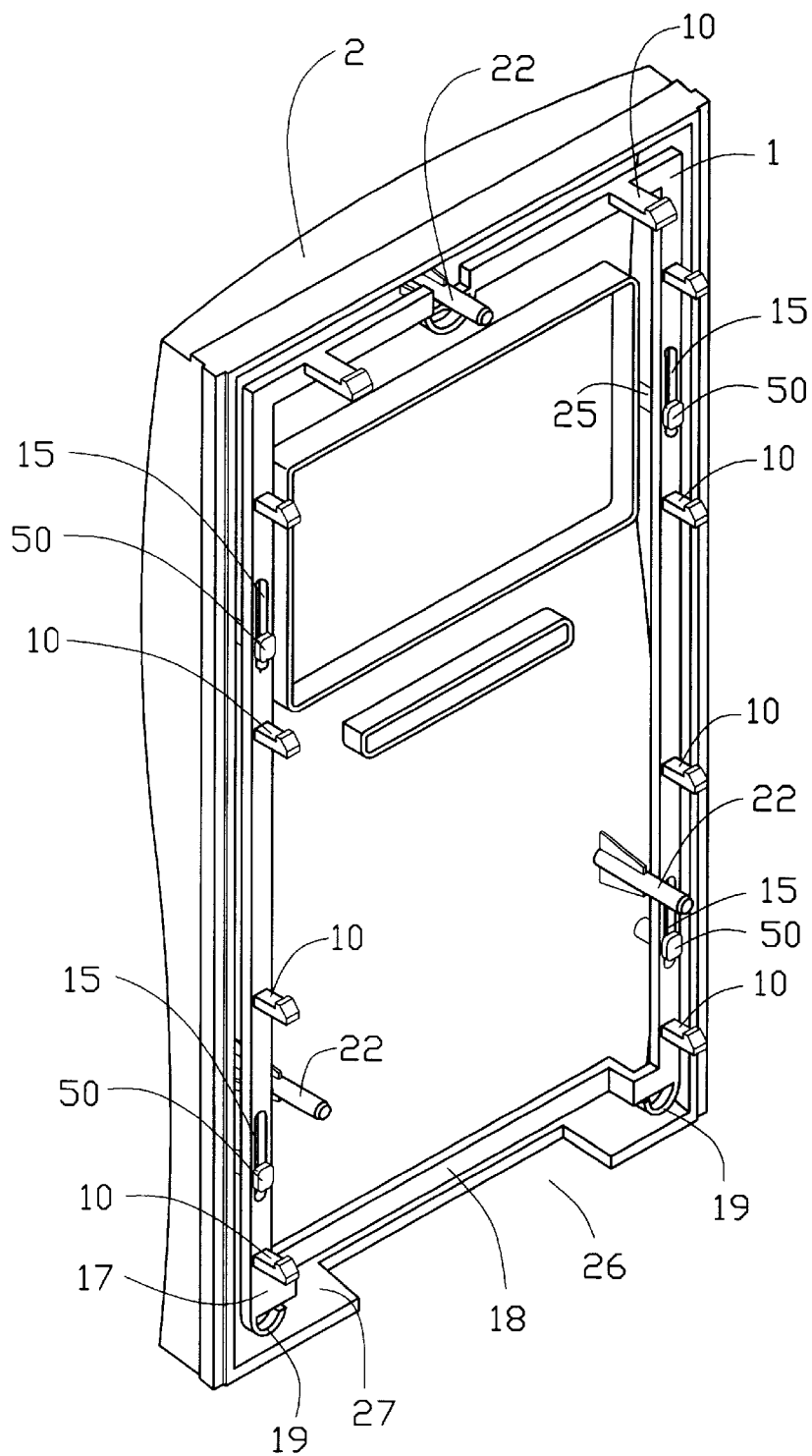
FIG. 2 is a perspective view showing the bezel mounted to the bezel mounting device of the present invention.
Figure 3:
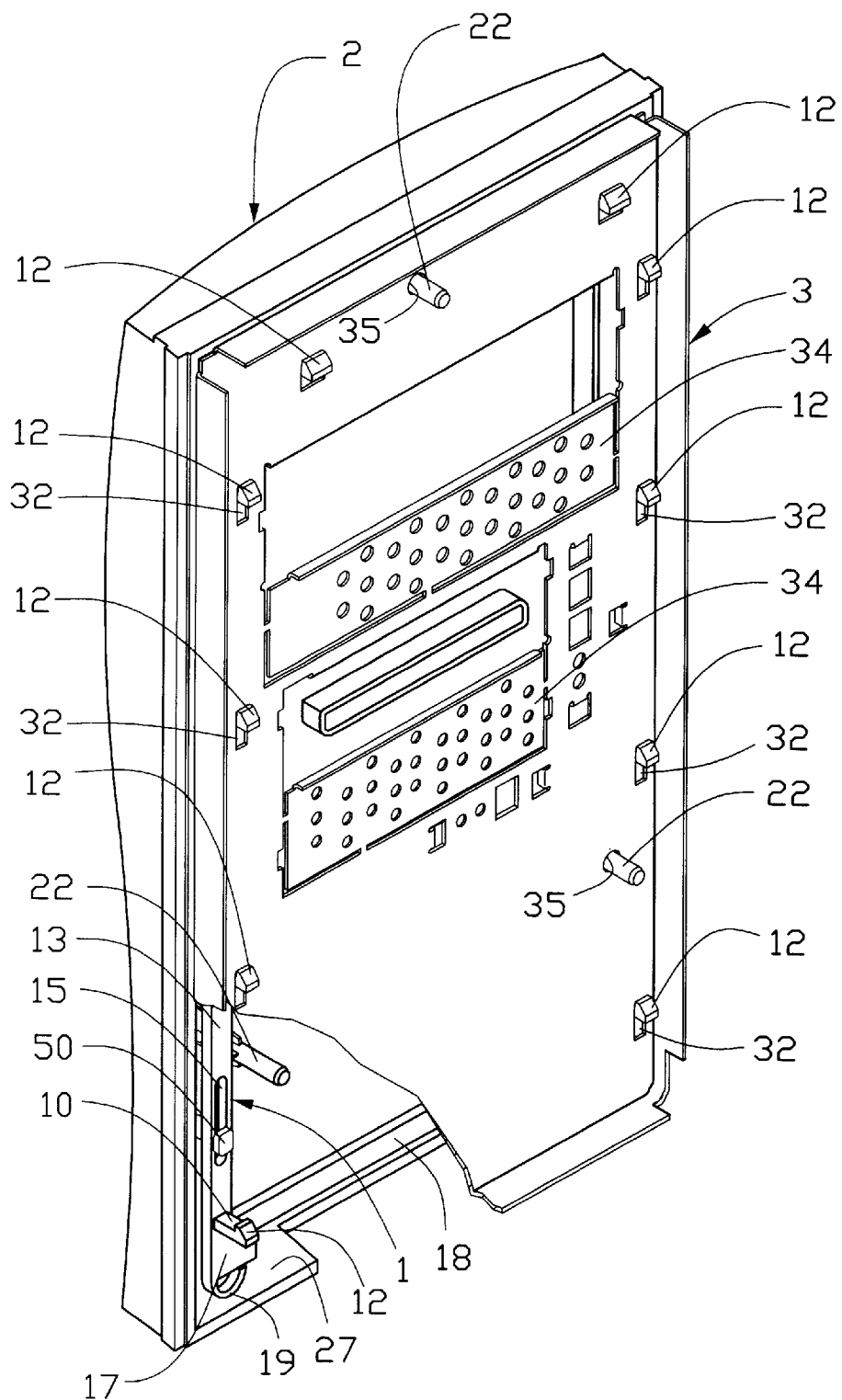
FIG. 3 is an assembled view of FIG. 1.

Referring to the drawings and in particular to FIGS. 1 and 2, a bezel mounting device 1 in accordance with the present invention mounts a bezel 2 to a front panel 3 of a casing. The bezel mounting device 1 comprises a flat, rectangular frame sandwiched between the bezel 2 and the front panel 3. The rectangular frame of the bezel mounting device 1 comprises an upper section 11, a lower section 17 and left and right sections 13, 14 connecting the upper and lower sections 11, 17. A plurality of arms 10 are spaced along the upper, left and right sections 11, 13, 14. Preferably, the resilient arms 10 are equally spaced. Each arm 10 has a free end forming a barb 12. All the barbs 12 face upward and have an inclined face (not labeled). Elongate slots 15 are defined in the left and right sections 13, 14 of the frame. Biasing means, comprising leaf springs 19, are formed on the lower section 17. In the embodiment illustrated, each leaf spring 19 comprises a resilient arcuate extension (not labeled) from the lower section 17. The arcuate extension has a fixed end mounted to the lower section 17 and a free end proximate the lower section 17 thereby forming a semi-circular configuration. If desired, both ends of the semi-circle may be fixed to the lower section 17. Other types of springs may serve as the biasing means 19 as well.

The bezel 2 comprises a front wall 20 defining openings 21, 23 for mounting and accessing disk drives (not shown). A plurality of posts 25 extend from the front wall 20 corresponding to the elongate slots 15 of the bezel mounting device 1. Each post 25 defines an inner-threaded bore 29. A bolt 50 extends through each elongate slot 15 and engages with the threaded bore 29 of the corresponding post 25 for attaching the bezel mounting device 1 to the bezel 2. The length of the elongate slots 15 allows the bezel mounting device 1 to move with respect to the bezel 2 between an upper, locked position and a lower, releasing position.

The bezel 2 has a flange 27 for supporting the bezel mounting device 1. The biasing means 19 is positioned on the bottom wall 27 of the bezel 2 and biases the bezel mounting device 1 toward the locked position thereof. The resiliency of the biasing means 19 allows the bezel mounting device 1 to be forced down to the lower position.

The front panel 3 of the casing defines openings 31, 33 corresponding to the openings 21, 23 of the bezel 2 for mounting and accessing the disk drives. If desired, shielding plates 34 may be provided to partially block the openings 31, 33 for electromagnetic interference shielding purposes.

The front panel 3 defines a plurality of holes 35 for receiving positioning pins 22 extending from the front wall 20 of the bezel 2 to properly position the bezel 2 with respect to the front panel 3. The upper section 11 of the bezel mounting device 1 defines a notch 16 corresponding to and partially receiving one the positioning pins 22 therein. The notch 16 serves to properly position the bezel mounting device 1 with respect to the bezel 2 and the front panel 3. The positioning pin 22 that is received in the notch 16 also serves as a stop against the upward movement of the bezel mounting device 1 caused by the biasing means 19. Reinforced ribs 40 are formed on the upper section 11 of the bezel mounting device 1 for reinforcing the notch 16.

A plurality of elongate slots 32 are defined in the front panel 3 corresponding to the arms 10 of the bezel mounting device 1 for receiving the barbs 12 thereof. The slots 32 are dimensioned to allow relative movement of the barbs 12 with respect thereto. The biasing means 19 biases the bezel mounting device 1 toward the upper position causing the barbs 12 that face upwardly to engage with upper edges of the slots 32 thereby retaining the bezel mounting device 1 between the bezel 2 and the front panel 3 and securing the bezel 2 to the front panel 3.

The lower section 17 of the bezel mounting device 1 forms a handle 18 which is accessed by a user through an opening 26 defined in the flange 27 of the bezel 2. The user may grip the handle 18 and pull the bezel mounting device 1 downward against the basing means 19 from the upper position to the lower position for disengaging the barbs 12 from the slots 32 of the front panel 3 thereby releasing the bezel mounting device 1 and the bezel 2 from the front panel 3 of the casing.

To mount the bezel 2 to the front panel 3, the bezel 2 is positioned such that the positioning pins 22 thereof are aligned with the openings 35 of the panel 3. The bezel 2 is forced toward the front panel 3 causing the barbs 12 to engage with the upper edges of the slots 32. The inclined camming surfaces of the barbs 12 act against the biasing means 19 and guide the barbs 12 into the slots 32. Thus, the bezel 2 is readily mounted to the front panel 3.

The bezel 2 is readily removed from the bezel mounting device 1 by loosening the bolts 50. A new bezel may then be mounted to the bezel mounting device 1 by re-tightening the bolts 50.

Although the present invention has been described with reference to the preferred embodiment, it is apparent to those skilled in the art that a variety of modifications and changes may be made without departing from the scope of the present invention which is intended to be defined by the appended claims.

What is claimed is:

1. A bezel mounting device comprising a bezel mounted to a front panel of a casing through a bezel mounting device, the bezel mounting device defining at least one elongate slot for movably receiving a corresponding post extending from the bezel for movably attaching the bezel mounting device to the bezel, the bezel mounting device being movable between a locking position and a releasing position, biasing means being arranged between the bezel and the bezel mounting device for biasing the bezel mounting device toward the locking position, said bezel mounting device comprising a flat member interposed between the bezel and the front panel, the flat member forming a frame having at least a bottom section and two side sections extending from the bottom section, and each side section forming at least one barb for engaging a corresponding slot defined in the front panel, said at least one barb movably received in the corresponding slot defined in the front panel, said at least one barb engaging with an edge of the corresponding slot to attach the bezel mounting device to the front panel when the bezel mounting device is biased to the locking position by the biasing means, wherein the biasing means is formed on the bottom section and supported by a flange extending from the bezel.

2. The bezel mounting device as claimed in claim 1 further comprising means for manually moving the bezel mounting device against the biasing means to the releasing position thereby disengaging the at least one barb from the edge of the slot of the front panel and releasing the bezel mounting device from the front panel.

3. The bezel mounting device as claimed in claim 2, wherein means for manually moving the bezel mounting device comprises a handle adapted to be gripped by a user's hand.

4. The bezel mounting device as claimed in claim 3, wherein an opening is defined in the bezel for the user's access to the handle.

5. The bezel mounting device as claimed in claim 1, wherein at least one positioning pin extends from the bezel and is received in a corresponding hole defined in the front panel for properly positioning the bezel mounting device with respect to the front panel.

6. The bezel mounting device as claimed in claim 5, wherein a notch is defined in the bezel mounting device for partially receiving the positioning pin of the bezel.

7. The bezel mounting device as claimed in claim 6, wherein the bezel mounting device comprises a flat member in which the notch is defined, ribs being formed on the flat member for reinforcing the notch.

8. The bezel mounting device as claimed in claim 1, wherein the biasing means comprises at least one arcuate extension from the bezel mounting device which is supported by said flange of the bezel.

9. The bezel mounting device as claimed in claim 8, wherein the arcuate extension is semi-circular with at least one end fixed to the bezel mounting device.

10. The bezel mounting device as claimed in claim 1, wherein the post defines an inner-threaded bore for receiving a bolt extending through the elongate slot of the bezel mounting device.

11. The bezel mounting device as claimed in claim 1, wherein the biasing means comprises an arcuate extension from the bottom section of the frame.

12. The bezel mounting device as claimed in claim 1, wherein each side section defines said at least one elongate slot for receiving said corresponding post of the bezel.

13. The bezel mounting device as claimed in claim 1, wherein the frame further comprises a top section connected between the side sections.

14. The bezel mounting device as claimed in claim 13, wherein the top section forms at least one barb for engaging with a corresponding slot defined in the front panel.

* * * * *